United States Patent [19]

Toussaint et al.

[11] 3,903,171

[45] Sept. 2, 1975

[54] PRODUCTION OF 2-ETHYLHEXAN-1-AL

[75] Inventors: Herbert Toussaint, Frankenthal; Guenter Boettger; Ludwig Schuster, both of Ludwigshafen, all of Germany

[73] Assignee: Badische Anilin- & Soda-Fabrik Aktiengesellschaft, Ludwigshafen (Rhine), Germany

[22] Filed: Feb. 16, 1971

[21] Appl. No.: 115,827

[30] Foreign Application Priority Data

Feb. 21, 1970 Germany.......................... 2008128

[52] U.S. Cl............................................ 260/601 R
[51] Int. Cl............................................. C07c 47/02
[58] Field of Search ............................... 260/601 R

[56] References Cited
UNITED STATES PATENTS 2,485,989  10/1949  Smith .............................. 260/601 R
2,825,743  3/1958  MacLean et al. ............... 260/601 R

FOREIGN PATENTS OR APPLICATIONS 1,065,628  4/1967  United Kingdom............. 260/601 R
916,119  1/1963  United Kingdom............. 260/601 R
1,206,878  12/1965  Germany

*Primary Examiner*—Donald G. Daus
*Assistant Examiner*—D. B. Springer
*Attorney, Agent, or Firm*—Johnston, Keil, Thompson & Shurtleff

[57] ABSTRACT

Improved process for the manufacture of 2-ethylhexan-1-al by hydrogenating 2-ethylhex-2-en-1-al at temperatures of from 80° to 160°C and at pressures of from 10 to 250 atmospheres in an irrigation zone in the presence of fixed-bed catalysts comprising platinum, palladium or ruthenium supported on carriers, the improvement comprising feeding crude 2-ethylhexan-1-al to the irrigation zone in an amount which is from 2 to 10 times the amount of freshly introduced 2-ethylhex-2-en-1-al.

5 Claims, No Drawings

PRODUCTION OF 2-ETHYLHEXAN-1-AL

This invention relates to a process for the manufacture of 2-ethylhexan-1-al by hydrogenating 2-ethylhex-2-en-1-al in the presence of noble metal catalysts.

On page 307 of Houben-Weyl "Methoden der organischen Chemie", Vol. IV/II, 1955 a method of hydrogenating olefinically unsaturated aldehydes in the presence of palladium or nickel catalysts is disclosed, in which the aldehyde group is retained when the hydrogenation is stopped as soon as the required amount of hydrogen for saturation of the carbon double bond has been absorbed. Such as method is not suitable for continuous operation, as is desirable in industry. German Patent 869,057 reveals that 2-ethylhexan-1-al may be obtained by hydrogenating 2-ethylhex-2-en-1-al in the presence of palladium catalysts. This process has the disadvantage, however, that the yield of 2-ethylhexanal is only from 88 to 90% and that not inconsiderable amounts of unreacted 2-ethylhex-2-en-1-al as well as ethylhexanol and higher boiling portions are also obtained. The process also suffers from the disadvantage that irregular hydrogenation occurs due to increases in the hydrogenating zone, as a result of which the process fails to run smoothly and the catalyst is damaged. Finally, the said process does not give the desired high space-time yields.

It is an object of the invention to provide a process in which 2-ethylhexan-1-al is produced in consistent and high quality over long periods. Another object of the invention is to provide a process which avoids temperature peaks and thus reduces catalyst damage and avoids the consequent reduction in the quality of the product.

In accordance with the present invention these and other object and advantages are achieved in an improved process for the manufacture of 2-ethylhexan-1-al by the hydrogenation of 2-ethylhex-2-en-1-al at temperatures of from 80° to 160°C and at pressures of from 10 bis 150 atmospheres in an irrigation zone in the presnece of fixed-bed catalysts comprising platinum, palladium or ruthenium supported on carriers, the improvements comprising feeding crude 2-ethylhexan-1-al to the irrigation zone in an amount with is from 2 to 10 times the amount of freshly introduced 2-ethylhex-2-en-1-al.

The novel process is notable in that it could not be foreseen that recycling of part of the crude 2-ethylhexanol would reduce the amount of by-products formed and increase the life of the catalyst. On the contrary, one would have expected that further hydrogenation of the 2-ethylhexanal to 2-ethylhexanol would occur and thus the amount of by-product formed would be increased.

The hydrogenation is carried out in an irrigation zone in the presence of fixed-bed support noble metal catalysts. Preferred noble metal catalysts are platinum, palladium and ruthenium supported on carriers such as alumina, silica or silca gel. Advantageously, the catalysts contain from 0.01 to 1% by weight, in particular from 0.03 to 0.3% by weight, of the said noble metals.

Of particular commercial value are supported noble metal catalysts, particularly palladium catalysts, which have been produced by impregnating silica carriers tempered at from 800° to 1,100°C, with noble metal salts, drying and, if necessary, retempering and subsequent reduction in the usual manner.

The reaction is carried out at temperatures of from 80° to 150°C. Particularly good results are obtained when a temperature of from 110° to 150°C is maintained. Advantageously, the temperature in the irrigation zone is controlled such that it shows a rising gradient from the inlet end of the reactor to the point of exit of the hydrogenated product. Thus the temperature at the top of the irrigation zone is preferably from 80° to 130°C and at the outlet of the zone it is preferably from 110° to 150°C depending upon the activity of the catalyst used.

In general, pressures of from 10 to 250 atmospheres are used during the reaction. Particularly good results are obtained using pressures of from 20 to 200 atmospheres.

A portion of the discharged crude 2-ethylhexan-1-al is recycled to the irrigation zone together with fresh 2-ethylhex-2-en-1-al. We have found it particularly advantageous to recycle an amount of 2-ethylhexan-1-al which is from 2 to 10 times the amount of freshly introduced 2-ethylhex-2-en-1-al per unit of time. Preferably the recycled portion is such that the temperature of the material entering the irrigation zone is as given above and the hydrogenation thus commences immediately without any induction period.

According to a particularly advantageous feature of the invention the amounts of 2-ethylhex-2-en-1-al and the recycled portion of crude 2-ethylhexan-1-al are such that the total material entering the irrigation zone provides a linear velocity of from 10 to 50 m/hr. By linear velocity we mean the rate of feed per hour in cubic meters per square meter of cross-section of the irrigation zone. The linear velocity may also be expressed in meters per hour.

The process of the invention is carried out, for example, by fixing the stated catalysts in a vertical pressure tube and feeding 2-ethylhex-2-en-1-al together with the stated amount of crude 2-ethylhexan-1-al to the top of the tube such that the above-mentioned feed temperatures are achieved. Hydrogenation proceeds under the pressures stated, the rate of feed being such that the aforementioned linear velocity is maintained. The discharged material is preferably cooled and freed from excess hydrogen. Part of the crude 2-ethylhexan-1-al is recycled to the irrigation zone together with fresh 2-ethylhex-2-en-1-al. The remaining portion of the crude 2-ethylhexan-1-al is worked up by conventional techniques, for example by fractional distillation, in order to remove the final traces of impurities. For many applications, however, the purity of the crude 2-ethylhexanal obtained is adequate.

2-Ethylhexan-1-al is used in the manufacture of 2-ethylhexanoic acid, which is converted to metal soaps and esters.

The advantageous results of the novel process are demonstrated below with reference to the Examples.

EXAMPLE 1

A high-pressure tube having a capacity of 200 liters and a diameter of 150 mm is charged with a catalyst containing 0.07% by weight of palladium supported on silica pellets. The hourly feed consists of 65 kg of 2-ethylhex-2-en-1-al together with 200 kg of crude 2-ethylhexan-1-al, passed to the top of the high-pressure tube, hydrogen also being fed in at a rate that a pressure of 200 atmospheres gage is maintained. The linear velocity was 15 m/hr. The temperature at the top of the irrigation zone is adjusted to about 100°C, and the temperature at the exit of the zone is then about 115°C. The discharged reaction mixture contains:

2-ethylhexanal 94.6%
2-ethylhexanal 0.8%.

COMPARATIVE EXAMPLE

Example 1 is repeated using the same apparatus and the same conditions of temperature and pressure, the feed consisting, however, of 40 kg/hr of 2-ethylhexenal with no recycling of 2-ethylhexan-1-al. The linear velocity was 2.3 m/hr. Hydrogenation is effected in the presence of the same catalyst as that used in Example 1, and the reaction product contains:

2-ethylhexanal 88.2%
2-ethylhexenal 2.2%.

EXAMPLE 2

Using an apparatus of the same size as that described in Example 1, charged with the same catalyst, 65 kg/hr of 2-ethylhex-2-en-1-al are fed to the top of the high-pressure tube together with 300 kg/hr of crude 2-ethylhexan-1-al at a pressure of 40 atmospheres gage. The linear velocity was 20.7 m/hr. The temperature profile is the same as that observed in Example 1. The reaction product obtained contains:

2-ethylhexanal 95.9%
2-ethylhexenal 0.7%.

We claim:

1. In a process for the manufacture of 2-ethylhexan-1-al by hydrogenating 2-ethylhex-2-en-1-al at temperatures of from 80° to 160°C and at pressures of from 20 to 200 atmospheres in the presence of fixed-bed palladium, platinum or ruthenium catalysts on alumina, silica or silica gel supports in an irrigation zone with part of the crude 2-ethylhexan-1-al being recycled, the improvement which comprises: recycling 2 to 10 times the amount of crude 2-ethylhexan-1-al with reference to the amount of 2-ethylhex-2-en-1-al introduced with the proviso that the total amount of material fed to the irrigation zone provides a linear velocity of 10 to 50 meters per hour.

2. A process as claimed in claim 1 wherein palladium is used as catalyst metal.

3. A process as claimed in claim 1 wherein the catalysts contain from 0.01 to 1% by weight of platinum, palladium or ruthenium.

4. A process as claimed in claim 1 wherein temperatures of from 110° to 150°C are used.

5. A process as claimed in claim 1 wherein the temperature at the inlet end of the irrigation zone is from 80° to 130°C and the temperature at the outlet end of the irrigation zone is from 110° to 150°C.

* * * * *